(12) United States Patent
Herling et al.

(10) Patent No.: US 11,854,230 B2
(45) Date of Patent: Dec. 26, 2023

(54) PHYSICAL KEYBOARD TRACKING

(71) Applicant: Meta Platforms Technologies, LLC, Menlo Park, CA (US)

(72) Inventors: Jan Herling, Seattle, WA (US); Daniel Scharstein, Weybridge, VT (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 122 days.

(21) Appl. No.: 17/108,617

(22) Filed: Dec. 1, 2020

(65) Prior Publication Data

US 2022/0172397 A1 Jun. 2, 2022

(51) Int. Cl.
| | |
|---|---|
| *G06T 7/11* | (2017.01) |
| *G06T 7/60* | (2017.01) |
| *G06T 7/73* | (2017.01) |
| *G06V 10/75* | (2022.01) |

(52) U.S. Cl.
CPC ............... *G06T 7/75* (2017.01); *G06T 7/11* (2017.01); *G06T 7/60* (2013.01); *G06V 10/751* (2022.01); *G06T 2207/20021* (2013.01)

(58) Field of Classification Search
CPC ..... G06T 7/11; G06T 7/60; G06T 7/75; G06T 2207/20021; G06V 10/7551
See application file for complete search history.

(56) References Cited

U.S. PATENT DOCUMENTS

| | | | |
|---|---|---|---|
| 5,692,061 A | * 11/1997 | Sasada | ............ G06T 7/75 |
| | | | 382/106 |
| 8,266,536 B2 | 9/2012 | Roberts et al. | |
| 8,615,383 B2 | 12/2013 | Dobbins et al. | |
| 8,806,354 B1 | 8/2014 | Hyndman et al. | |
| 8,949,159 B2 | 2/2015 | Krishnakumar et al. | |
| 9,038,127 B2 | 5/2015 | Hastings et al. | |

(Continued)

FOREIGN PATENT DOCUMENTS

| | | | |
|---|---|---|---|
| AU | 2018101226 A4 | * 9/2018 | ........... G02B 27/017 |
| AU | 2019200032 A1 | * 1/2019 | |

(Continued)

OTHER PUBLICATIONS

Boulanger ("Application of augmented reality to industrial tele-training," First Canadian Conference on Computer and Robot Vision, 2004. Proceedings; Date of Conference: May 17-19, 2004) (Year: 2004).*

(Continued)

*Primary Examiner* — Yubin Hung
(74) *Attorney, Agent, or Firm* — Baker Botts L.L.P.

(57) ABSTRACT

In one embodiment, a method includes the steps of capturing an image from a camera viewpoint, the image depicting a physical keyboard, detecting one or more shape features of the physical keyboard depicted in the image by comparing pixels of the image to a predetermined shape template, the predetermined shape template representing visual characteristics of spaces between keyboard keys, accessing predetermined shape features of a keyboard model associated with the physical keyboard, and determining a pose of the physical keyboard based on comparisons between (1) the detected one or more shape features of the physical keyboard and (2) projections of the predetermined shape features of the keyboard model toward the camera viewpoint.

20 Claims, 14 Drawing Sheets

(56) References Cited

U.S. PATENT DOCUMENTS

| | | |
|---|---|---|
| 9,836,595 B1 | 12/2017 | Goldberg et al. |
| 10,347,040 B2 | 7/2019 | Boulkenafed et al. |
| 11,302,085 B2 | 4/2022 | LeBeau et al. |
| 2003/0005177 A1 | 1/2003 | Duran et al. |
| 2009/0113066 A1 | 4/2009 | Van Wie et al. |
| 2009/0119604 A1 | 5/2009 | Simard et al. |
| 2009/0207045 A1* | 8/2009 | Jung .................. G06T 7/74 340/932.2 |
| 2010/0214226 A1 | 8/2010 | Brown et al. |
| 2011/0251719 A1* | 10/2011 | Lien .................. G06F 11/2221 700/245 |
| 2012/0192088 A1 | 7/2012 | Sauriol et al. |
| 2012/0302076 A1 | 11/2012 | Tsai |
| 2013/0335405 A1 | 12/2013 | Scavezze et al. |
| 2014/0035819 A1* | 2/2014 | Griffin .................. G06F 3/0238 345/168 |
| 2014/0123170 A1 | 5/2014 | Kummer |
| 2016/0313790 A1 | 10/2016 | Clement et al. |
| 2016/0314624 A1 | 10/2016 | Li et al. |
| 2017/0262045 A1 | 9/2017 | Rouvinez et al. |
| 2017/0269713 A1 | 9/2017 | Marks et al. |
| 2018/0004305 A1 | 1/2018 | Moseley et al. |
| 2018/0095542 A1 | 4/2018 | Mallinson |
| 2018/0284982 A1 | 10/2018 | Veeramani et al. |
| 2018/0307303 A1 | 10/2018 | Powderly et al. |
| 2018/0350150 A1* | 12/2018 | Powderly .............. G06F 3/0213 |
| 2019/0327392 A1 | 10/2019 | Sarkar |
| 2019/0394444 A1 | 12/2019 | Oh et al. |
| 2020/0151065 A1 | 5/2020 | Rinaldi et al. |
| 2020/0175766 A1 | 6/2020 | Gawrys et al. |
| 2020/0200906 A1* | 6/2020 | Li .................. G01S 17/66 |
| 2021/0065455 A1 | 3/2021 | Beith et al. |
| 2021/0144220 A1 | 5/2021 | Zavesky et al. |
| 2021/0336784 A1 | 10/2021 | Athlur et al. |
| 2022/0053218 A1 | 2/2022 | Malecki |
| 2022/0066620 A1 | 3/2022 | Anderson et al. |
| 2022/0084288 A1 | 3/2022 | LeBeau et al. |
| 2022/0124125 A1 | 4/2022 | Punwani et al. |
| 2022/0172444 A1 | 6/2022 | LeBeau et al. |

FOREIGN PATENT DOCUMENTS

| | | | |
|---|---|---|---|
| CN | 101986717 B | * | 12/2012 |
| CN | 111427447 A | | 7/2020 |
| JP | 2007219966 A | * | 8/2007 |
| NO | 343601 B1 | | 4/2019 |
| WO | 2019059944 A1 | | 3/2019 |

OTHER PUBLICATIONS

International Search Report and Written Opinion for International Application No. PCT/US2021/061029, dated Mar. 18, 2022, 8 pages.

International Search Report and Written Opinion for International Application No. PCT/US2021/050427, dated Feb. 25, 2022, 19 pages.

Invitation to Pay Additional Fees for International Application No. PCT/US2021/050427, dated Jan. 4, 2022, 14 pages.

* cited by examiner

US 11,854,230 B2

PHYSICAL KEYBOARD TRACKING

TECHNICAL FIELD

This disclosure generally relates to rendering Augmented-Reality (AR) or Virtual-Reality (VR) content on user devices. This disclosure generally relates to input controllers for use in AR/VR environments.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

Augmented reality provides a view of the real or physical world with added computer-generated sensory inputs (e.g., visual, audible). In other words, computer-generated virtual effects may augment or supplement the real-world view. For example, a camera on a virtual reality headset, or a head mounted display (HMD), may capture a real-world scene (as an image or video) and display a composite of the captured scene with computer-generated virtual objects. The virtual objects may be, for example, two-dimensional and/or three-dimensional objects, and may be stationary or animated.

SUMMARY OF PARTICULAR EMBODIMENTS

Figure 1:
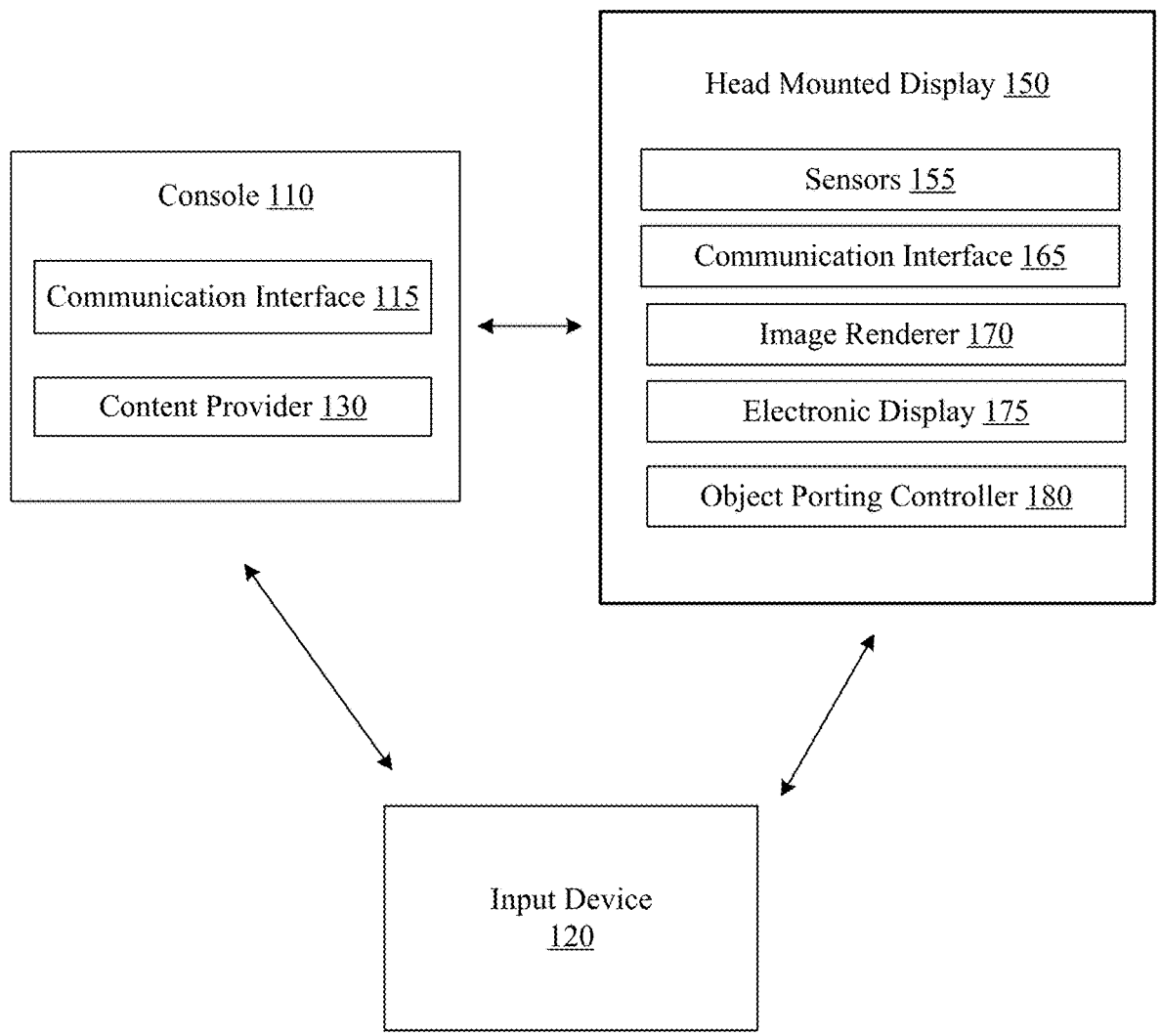
FIG. 1 is a block diagram of an example artificial reality system environment in which a console operates.

Embodiments disclosed herein describe, but are not limited to, determining the precise location and orientation (pose) of a physical keyboard and rendering an image of a virtual model corresponding to the physical keyboard to precisely match the pose of the physical keyboard. Keyboard tracking with high precision is difficult. Machine-learning approaches are too slow for providing real-time applications of keyboard tracking and too imprecise due to the low quality of the cameras used for tracking. Thus, a computer-vision approach is needed. However, a variety of factors also make computer-vision approaches difficult. For example, accurate feature detection based on images captured by outward facing cameras of a head mounted display (HMD) is difficult because the captured images could have low-resolution and high-noise, and the keyboard's features have low-contrast. Furthermore, the features of the keyboard are often occluded by a user's hands, and the lighting conditions can be suboptimal for accurate feature detection. The captured images may also be warped or distorted since some devices use fisheye lenses for the outward facing cameras to maximize tracking coverage.

To address these issues, the invention disclosed herein looks for predefined T, X, and L features formed by the space between keys on the physical keyboard, which are distinct features that can be detected even in low-resolution, distorted, or partially occluded keyboard images. The method may begin by capturing an image of the keyboard. If the image is distorted (e.g., due to being captured by fisheye lens), the image may be corrected by generating a rectilinear image of the keyboard. Then using a gradient- and variance-based approach, T, X, and L features of the keyboard are detected. The gradient- and variance-based approach leverages the distribution and difference of pixel intensities in the border regions of keys (uniform regions surrounding the symbol on each key) and pixel intensities in the spaces between adjacent keys. For any given keyboard, based on the difference of pixel intensities, unique patterns of T-shapes, L-shapes, and/or X-shapes (or cross, "+", shapes) can be detected. These unique patterns can be compared to pre-mapped models of various keyboards in a database. Once a virtual model matching the physical keyboard is found, the virtual model can be rendered to precisely match the pose of the physical keyboard by mapping it to the detected features of the physical keyboard. This technique allows the physical keyboard to be tracked at a sub-millimeter accuracy. This technique may also be generalized to track any real-world objects that often have T, X, and L features.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Disclosed herein are embodiments related to systems and methods for porting a physical object in a physical space into a virtual space of a virtual reality. In one aspect, porting a physical object in the physical space into the virtual space includes activating a physical object in the physical space to obtain a virtual model of the physical object, and rendering an image of the virtual model in the virtual space.

In some embodiments, a physical object is activated during a pass-through mode, in which an HMD presents or renders a view of the physical space to a user of the head mounted display. For example, a virtual model of the physical object may be identified or selected during the pass-through mode and rendered in the virtual space. The physical object in the physical space may be tracked, and a location and an orientation of the virtual model in the virtual space may be adjusted according to a location and an orientation of the physical object in the physical space. In one aspect, an indication of an interaction of a user with the physical object in the physical space may be presented on the virtual model in the virtual space as a feedback to the user.

In one aspect, the physical object is a generic input device (e.g., a keyboard or a mouse) that may be manufactured or produced by a company different from a company manufacturing or producing the head mounted display and/or a dedicated handheld input device (e.g., a pointing device). By rendering a virtual model of the input device as reference or guidance (e.g., as a proxy for the input device) to the user in the field of view of the user, a user can easily reach out to the virtual model and thus to the input device, and provide inputs to the virtual reality through the input device.

In one aspect, relative to the virtual model in the virtual space (e.g., using the virtual model in the virtual space for spatial guidance), spatial feedback on the user's interaction with the input device in the physical space can be visually provided to the user. In one approach, an input device in a physical space relative to a user of the input device is detected. The virtual model of the detected input device in a virtual space at a location and an orientation (pose) may be presented, by a display device to the user. The location and the orientation of the virtual model in the virtual space may correspond to (e.g., track with, or mirror) a location and an orientation of the input device in the physical space relative to the user. Relative to the virtual model in the virtual space (and a virtual representation of the user's hand for instance), spatial feedback on the user's interaction with the input device in the physical space can be visually provided to the user via the virtual space. Accordingly, through the spatial feedback relative to the virtual model, a user may easily locate and reach the input device, and provide inputs through the input device in the physical space while enjoying the virtual reality experience (e.g., while viewing the virtual space instead of the physical space).

Although systems and methods disclosed herein may refer to porting a physical object to a virtual reality, general principles disclosed herein may be applicable to augmented reality, or mixed reality.

FIG. 1 is a block diagram of an example artificial reality system environment 100 in which a console 110 operates. In some embodiments, the artificial reality system environment 100 includes an HMD 150 worn by a user, and a console 110 providing content of an artificial reality to the HMD 150. In one aspect, the HMD 150 may detect its location, orientation, and/or a gaze direction of the user wearing the HMD 150, and can provide the detected location and the gaze direction to the console 110. The console 110 may determine a view within the space of the artificial reality corresponding to the detected location, orientation, and/or the gaze direction, and generate an image depicting the determined view. The console 110 may provide the image to HMD 150 for rendering. In some embodiments, the artificial reality system environment 100 includes an input device 120 that is communicatively coupled to the console 110 or the HMD 150 through a wired cable, a wireless link (e.g., Bluetooth, Wi-Fi, etc.) or both. The input device 120 may be a dedicated hardware (e.g., a pointing device or a controller) with motion sensors, a generic keyboard, a mouse, etc. Through the input device 120, the user may provide inputs associated with the artificial reality presented. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HMD 150. For example, some of the functionality of the HMD 150 may be performed by the console 110. In some embodiments, the console 110 is integrated as part of the HMD 150.

In some embodiments, the HMD 150 includes or corresponds to an electronic component that can be worn by a user and can present or provide an artificial reality experience to the user. The HMD 150 may render one or more images, video, audio, or some combination thereof to provide the artificial reality experience to the user. In some embodiments, audio is presented via an external device (e.g., speakers and/or headphones) that receives audio information from the HMD 150, the console 110, or both, and presents audio based on the audio information. In some embodiments, the HMD 150 includes sensors 155, a communication interface 165, an image renderer 170, an electronic display 175, and/or an object porting controller 180. These components may operate together to detect a location and an orientation of the HMD 150, and/or a gaze direction of the user wearing the HMD 150, and can render an image of a view within the artificial reality corresponding to the detected location and the orientation of the HMD 150, and/or the gaze direction of the user. In other embodiments, the HMD 150 includes more, fewer, or different components than shown in FIG. 1. In some embodiments, the object porting controller 180 may be activated or deactivated according to a control from a user of the HMD 150.

In some embodiments, the sensors 155 include electronic components or a combination of electronic components and software components that detect a location, an orientation of the HMD 150, and/or a gaze direction of the user. Examples of sensors 155 can include: one or more imaging sensors, one or more accelerometers, one or more gyroscopes, one or more magnetometers, a global positioning system, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the imaging sensors can capture an image for detecting a physical object, a user gesture, a shape of the hand, a user interaction, etc. In some embodiments, the sensors 155 detect the translational movement and the rotational movement, and determine an orientation and location of the HMD 150. In one aspect, the sensors 155 can detect the translational movement and the rotational movement with respect to a previous orientation and location of the HMD 150, and determine a new orientation and/or location of the HMD 150 by accumulating or integrating the detected translational movement and/or the rotational movement. Assuming for an example that the HMD 150 is oriented in a direction 25 degrees from a reference direction, in response to detecting that the HMD 150 has rotated 20 degrees, the sensors 155 may determine that the HMD 150 now faces or is oriented in a direction 45 degrees from the reference direction. Assuming for another example that the HMD 150 was located two feet away from a reference point in a first direction, in response to detecting that the HMD 150 has moved three feet in a second direction, the sensors 155 may determine that the HMD 150 is now located at a vector multiplication of the two feet in the first direction and the three feet in the second direction from the reference point. In one aspect, according to the location and the orientation of the HMD 150, a gaze direction of the user can be determined or estimated.

In some embodiments, the sensors 155 can include electronic components or a combination of electronic components and software components that generate sensor measurements of a physical space. Examples of the sensors 155 for generating sensor measurements can include one or more imaging sensors, a heat sensor, etc. In one example, an imaging sensor can capture an image corresponding to the user's field of view (or a view from a location of the HMD 150 according to an orientation of the HMD 150) in the physical space. An image processing can be performed on the captured image to detect a physical object or a portion of the user in the physical space.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a universal serial bus (USB), Ethernet, Firewire, high-definition multimedia interface (HDMI), or any wired communication link. In the embodiments, in which the console 110 and the HMD 150 are implemented on a single system, the communication interface 165 may communicate with the console 110 through at least a bus connection or a conductive trace. Through the communication link, the communication interface 165 may transmit to the console 110 data indicating the determined location of the HMD 150 and the orientation of the HMD 150, and/or the gaze direction of the user. Moreover, through the communication link, the communication interface 165 may receive from the console 110 data indicating image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)). The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. The image renderer 170 may receive the compressed image from the console 110, and decompress the compressed image, such that a communication bandwidth between the console 110 and the HMD 150 can be reduced. In one aspect, the process of detecting, by the HMD 150, the location of the HMD 150, the orientation of the HMD and/or the gaze direction of the user wearing the HMD 150, and generating and transmitting, by the console 110, a high resolution image (e.g., 1920 by 1080 pixels) corresponding to the detected location, the orientation, and/or the gaze direction to the HMD 150 may be computationally exhaustive and may not be performed within a frame time (e.g., less than 11 ms). The image renderer 170 may generate one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HMD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the object porting controller 180 includes an electronic component or a combination of an electronic component and a software component that activates a physical object and generates a virtual model of the physical object. In one approach, the object porting controller 180 detects a physical object in a physical space during a pass-through mode, in which the sensors 155 can capture an image of a user's view (or field of view) of the physical space, and the electronic display 175 can present the captured image to the user. The object porting controller 180 may a generate a virtual model of the physical object and present the virtual model in a virtual space, in which the electronic display 175 can display the user's field of view of the virtual space. Detailed description on the activating the physical object and rendering a virtual model of the physical object are provided below.

In some embodiments, the console 110 is an electronic component or a combination of an electronic component and a software component that provides content to be rendered through the HMD 150. In one aspect, the console 110 includes a communication interface 115 and a content provider 130. These components may operate together to determine a view of the artificial reality corresponding to the location of the HMD 150, the orientation of the HMD 150, and/or the gaze direction of the user of the HMD 150, and can generate an image of the artificial reality corresponding to the determined view. In other embodiments, the console 110 includes more, fewer, or different components than shown in FIG. 1. In some embodiments, the console 110 performs some or all functionalities of the HMD 150. In some embodiments, the console 110 is integrated as part of the HMD 150 as a single device.

In some embodiments, the communication interface 115 is an electronic component or a combination of an electronic component and a software component that communicates with the HMD 150. The communication interface 115 may be a counterpart component to the communication interface 165 to communicate through a communication link (e.g., USB cable). Through the communication link, the communication interface 115 may receive from the HMD 150 data indicating the determined location of the HMD 150, the orientation of the HMD 150, and/or the determined gaze direction of the user. Moreover, through the communication link, the communication interface 115 may transmit to the HMD 150 data describing an image to be rendered.

The content provider 130 is a component that generates content to be rendered according to the location of the HMD 150, the orientation of the HMD 150, and/or the gaze direction of the user of the HMD 150. In one aspect, the content provider 130 determines a view of the artificial reality according to the location of the HMD 150, the orientation of the HMD 150, and/or the gaze direction of the user of the HMD 150. For example, the content provider 130 maps the location of the HMD 150 in a physical space to a location within a virtual space, and determines a view of the virtual space along the gaze direction from the mapped location in the virtual space. The content provider 130 may generate image data describing an image of the determined view of the virtual space, and transmit the image data to the HMD 150 through the communication interface 115. In some embodiments, the content provider 130 generates metadata including motion vector information, depth information, edge information, object information, etc., associated with the image, and transmits the metadata with the image data to the HMD 150 through the communication interface 115. The content provider 130 may compress and/or encode the data describing the image, and can transmit the compressed and/or encoded data to the HMD 150. In some embodiments, the content provider 130 generates and provides the image to the HMD 150 periodically (e.g., every 11 ms).

Figure 2:
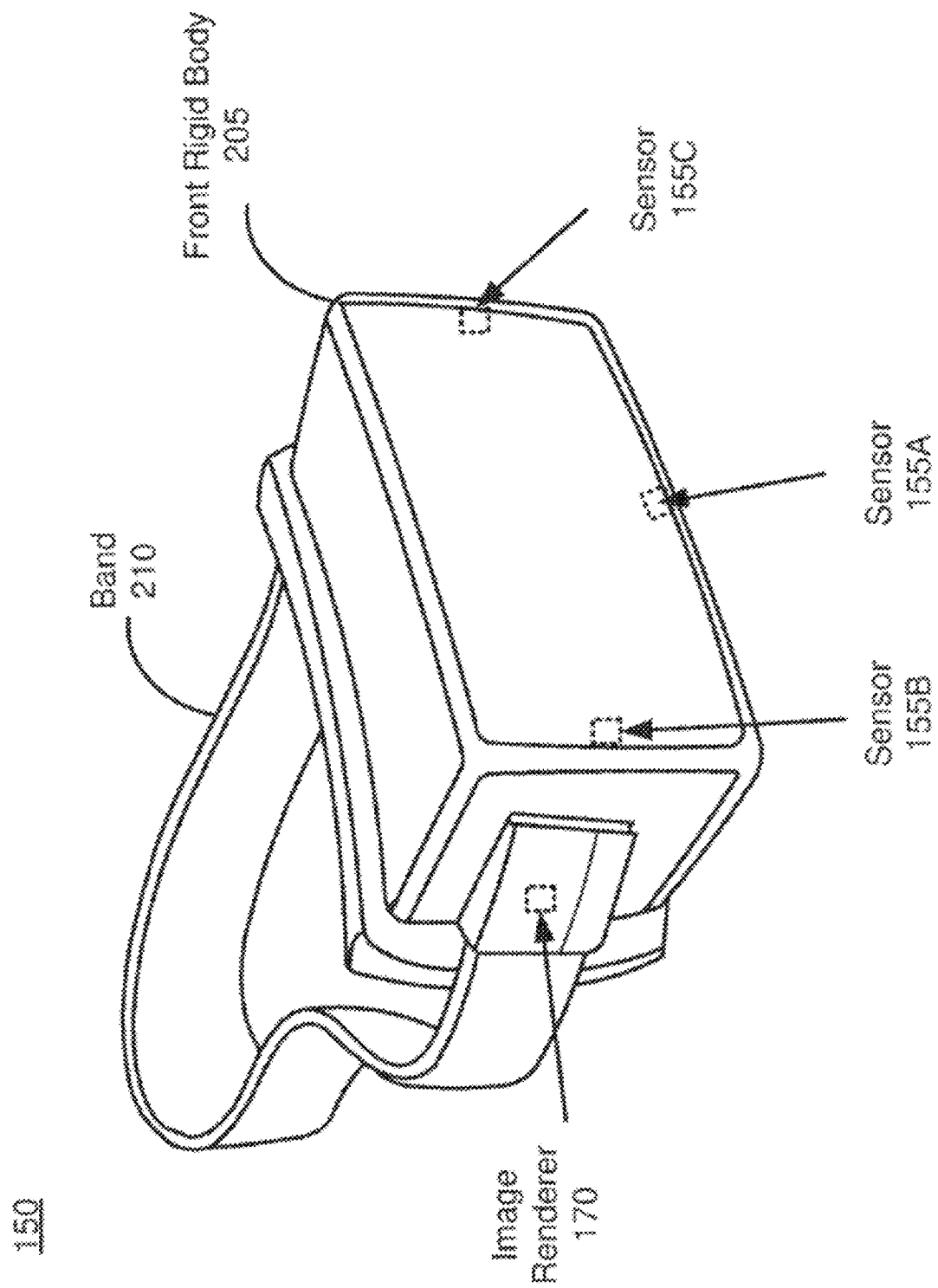
FIG. 2 is a diagram of the HMD, in accordance with an example embodiment

FIG. 2 is a diagram of the HMD 150, in accordance with an example embodiment. In some embodiments, the HMD 150 includes a front rigid body 205 and a band 210. The front rigid body 205 includes the electronic display 175 (not shown in FIG. 2), the sensors 155A, 155B, 155C, and the image renderer 170. The sensor 155A may be an accelerometer, a gyroscope, a magnetometer, or another suitable type of sensor that detects motion and/or location. The sensors 155B, 155C may be imaging sensors that capture images for detecting a physical object, a user gesture, a shape of a hand, a user interaction, etc. In some embodiments, the sensors 155B and 155C may be imaging sensors with fish eye lens. The HMD 150 may include additional components (e.g., GPS, wireless sensor, microphone, heat sensor, etc.). In other embodiments, the HMD 150 has a different configuration than shown in FIG. 2. For example, the image renderer 170, and/or the sensors 155A, 155B, 155C may be disposed in different locations than shown in FIG. 2.

Figure 3:
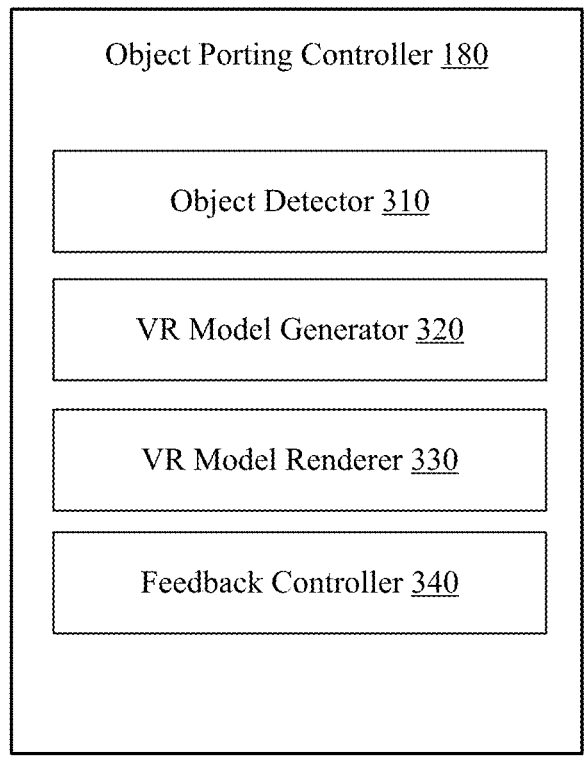
FIG. 3 is a diagram of an object porting controller.

FIG. 3 is a diagram of an object porting controller 180 of FIG. 1, according to an example implementation of the present disclosure. In some embodiments, the object porting controller 180 includes an object detector 310, a VR model generator 320, a VR model renderer 330, and a feedback controller 340. These components may operate together to detect a physical object and present a virtual model of the physical object. The virtual model may be identified, activated or generated, and may be presented, such that a user of HMD 150 may locate the physical object while wearing the HMD 150. In some embodiments, these components may be implemented as hardware, software, or a combination of hardware and software. In some embodiments, these components are implemented as application specific integrated circuit (ASIC) or a field programmable gate array (FPGA). In some embodiments, these components are implemented as a processor and a non-transitory computer readable medium storing instructions when executed by the processor cause the processor to perform various processes disclosed herein. In some embodiments, the object porting controller 180 includes more, fewer, or different components than shown in FIG. 3. In some embodiments, functionalities of some components may be performed by or in conjunction with the content provider 130 or a remote server. For example, some functionalities of the object detector 310, the VR model generator 320, or both, may be performed by the content provider 130 or a remote server. In some embodiments, the object porting controller 180 includes more, fewer, or different components than shown in FIG. 3.

In some embodiments, the object detector 310 is or includes a component that detects a physical object in a physical space according to a captured image. In one application, the object detector 310 detects an input device (e.g., keyboard or a mouse) in the physical space by performing image processing on the captured image. In one approach, the object detector 310 detects a contour, an outline, and/or a layout of keys or buttons (e.g., formed by the keys themselves or spaces between the keys), or a combination of these, of the physical object in the captured image, and determines a type of the physical object according to the detected contour, outline, and/or the layout of keys or buttons. For example, the object detector 310 determines whether a physical object in the user's point of view of the physical space is a keyboard or a mouse according to the detected contour, outline, and/or the layout of keys or buttons of the physical object. The object detector 310 may also locate the physical object according to a heat sensor that detects a heat map of the physical object. In one example, the object detector 310 may detect that the physical object has a particular number of keys according to an outline of the physical object in the captured image, and determine that the physical object is a keyboard.

In one aspect, the object detector 310 detects the physical object and presents, through the electronic display 175, a view or a portion of the view of the physical space to the user of the HMD 150. For example, an image (e.g., of a physical object and/or part of a user) captured by the imaging sensor (e.g., sensor 155B, 155C) of the HMD 150 can be presented (e.g., with or without blending with imagery of a virtual model and/or virtual space) to the user through the electronic display 175. Hence, a user wearing the HMD 150 can detect and/or locate a physical object in a physical space through the HMD 150, e.g., using image processing on image(s) acquired by the imaging sensor.

In some embodiments, the VR model generator 320 is or includes a component that generates, obtains, or identifies a virtual model for the detected physical object. In one approach, the VR model generator 320 stores a plurality of candidate models for different manufacturing companies, brands and/or product models. The VR model generator 320 may compare the detected contour, outline, and/or layout of keys or buttons (e.g., formed by the keys themselves or spaces between the keys) with contours, outlines, and/or layouts of keys or buttons of the plurality of candidate models, and identifies or determines a candidate model having a contour, outline, and/or layout of keys or buttons matching or closest to the detected contour, outline, and/or layout of keys of the physical object. The VR model generator 320 may detect or receive a product identification of the physical object, and identify or determine a candidate model corresponding to the detected product identification. The virtual model generator 320 may generate, determine, obtain, or select the determined candidate model as the virtual model of the physical object.

In some embodiments, the VR model renderer 330 is or includes a component that renders an image of the virtual model of the physical object. In one approach, the VR model renderer 330 tracks a physical object in the captured image, and determines a location and an orientation of the physical object relative to the user or the HMD 150. In one aspect, a location and an orientation of the physical object relative to the user or the HMD 150 may change, because the user may move around while wearing the HMD 150. The VR model renderer 330 may determine a six degrees of freedom (e.g., forward/backward (surge), up/down (heave), left/right (sway) translation, side-to-side tilt (roll), forward/backward tilt (pitch), left/right turn (yaw)) of the virtual model such that the location and the orientation of the virtual model in the virtual space relative to the user or the HMD 150 as viewed or displayed, can correspond to the location and the orientation of the physical object relative to the user or the HMD 150 in the captured image. In particular embodiments, the VR model renderer 330 may track certain features of the physical object (e.g., four corners and/or sides of a keyboard, shapes formed by spaces between the keys and/or patterns formed by a group of such shapes) by performing image processing on the captured image, and determine the location and the orientation (pose) of the virtual model to match, correspond, track, or fit the features of the physical object in the captured image. The VR model renderer 330 may present the virtual model according to the location and the orientation of the virtual model through the electronic display 175. In one aspect, the VR model renderer 330 tracks the physical object and updates the location and the orientation of the virtual model while the user is wearing the HMD 150, in which the electronic display 175 presents the user's point/field of view of a virtual space. Due to the virtual model presented in the virtual space and acting as spatial guidance or reference, the user may easily locate and reach the physical object while not being able to actually see the physical object due to wearing the HMD.

In some embodiments, the feedback controller 340 is or includes a component that generates spatial feedback of a user interaction with the physical object. In one aspect, the feedback controller 340 detects and tracks a hand of the user of the HMD 150 in the captured image, and visually provides a spatial feedback on the user's movement and/or interaction with the physical object through the electronic display 175. The spatial feedback may be provided relative to the virtual model. In one example, the feedback controller 340 determines whether the user's hand is within a predetermined distance from (or proximity to) the physical object. If the user's hand is within the predetermined distance from the physical object (e.g., keyboard), the feedback controller 340 may generate or render a virtual model of the user's hand and present the virtual model of the user's hand in the virtual space through the electronic display 175. If the user's hand is not within the predetermined distance from the physical object (e.g., keyboard), the feedback controller 340 may not present or render the virtual model of the user's hand through the electronic display 175. In some embodiments, the feedback controller 340 determines or generates a region (e.g., rectangular region or other regions) surrounding the virtual model in the virtual space, and may present the region through the electronic display 175. When the user's hand is within the region, a portion of a virtual model of the hand or a pass-through image of the portion of the hand within the region can be presented (e.g., with or without blending with other imagery) as a spatial feedback.

In one example, the feedback controller 340 determines that a portion of the physical object is in interaction with the user, and indicates that a corresponding portion of the virtual model is in interaction with the user through the electronic display 175. For example, the feedback controller 340 determines that a key or a button of a keyboard is pressed by performing image processing on the captured image or by receiving an electrical signal corresponding to the user input through the keyboard. The feedback controller 340 may highlight a corresponding key or a corresponding button of a virtual model to indicate which key of the keyboard is pressed. Accordingly, the user can confirm whether the input provided through the physical object is correct or not, while not being able to actually see the physical object due to wearing the HMD.

Figure 4:
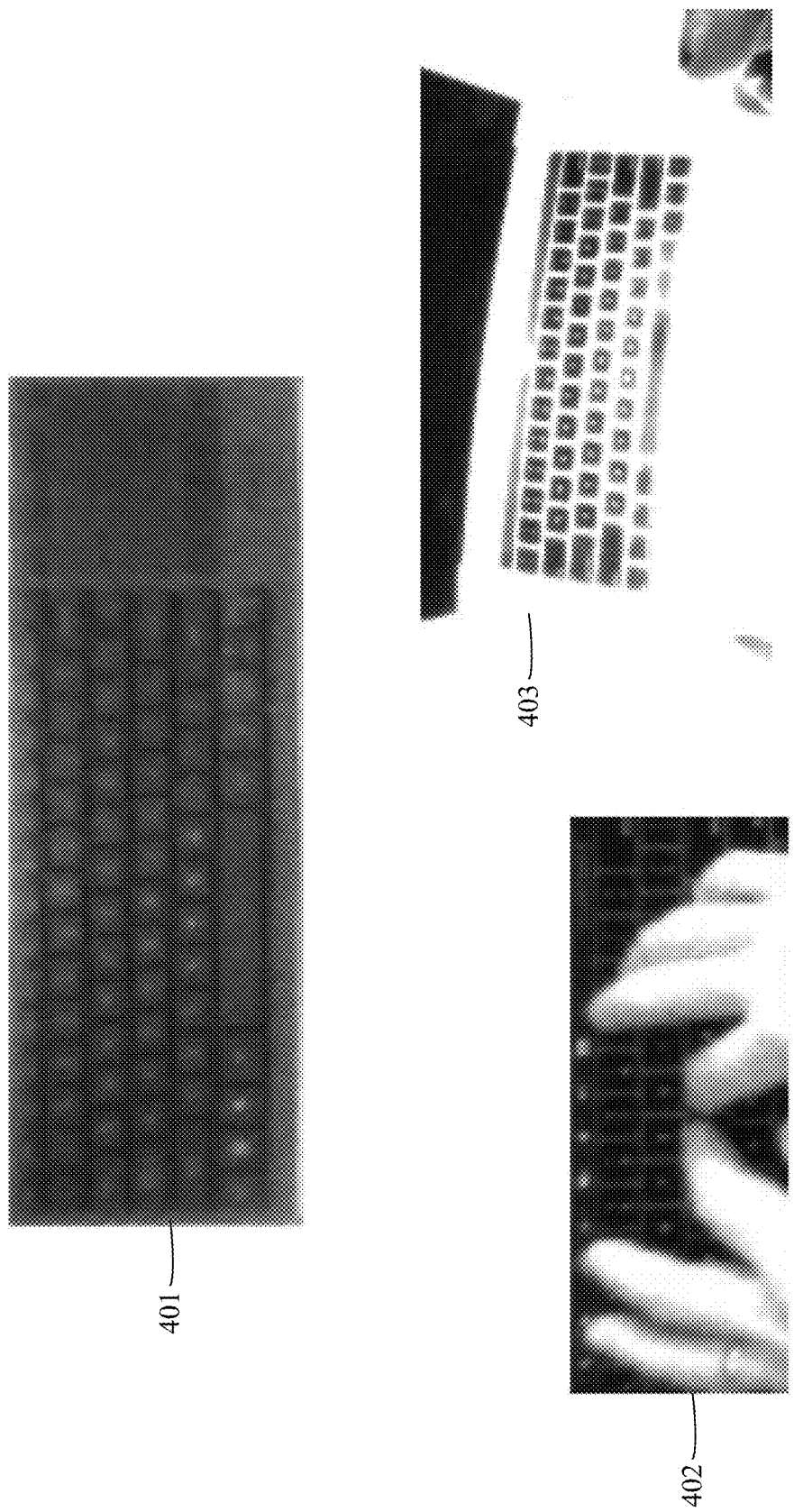
FIG. 4 shows example images captured by imaging sensors of an HMD.

In practice, providing accurate, real-time spatial feedback of a user interaction with a physical object may be difficult. Typically, images of a physical object captured by an HMD's outward facing imaging sensors cannot be used directly to provide accurate spatial feedback to users because the images are often occluded (e.g., by the user's hands) or have low-resolution, high-noise, or low-contrast features. For example, FIG. 4 shows images 401, 402, 403 captured by imaging sensors of an HMD, which images are either occluded by a user's hands or have low-resolution, high-noise, or low-contrast features. One solution for providing spatial feedback to users using such images is by determining the precise pose of the physical object depicted in the images and rendering a virtual model in the virtual space that precisely tracks the pose of the physical object. However, determining the pose of any physical object precisely enough to provide spatial feedback is difficult if the images are partially occluded, or have low-resolution, high-noise, or low-contrast features. The invention of this disclosure provides methods for accurately determining the pose of a physical object, such as keyboard, by detecting distinct features that can be detected even in low-resolution, high-noise, or partially occluded images. Although many embodiments of this disclosure describe determining the pose of a physical keyboard, the disclosure corresponds to any physical object with similar distinct features as those described herein.

Figure 5A:
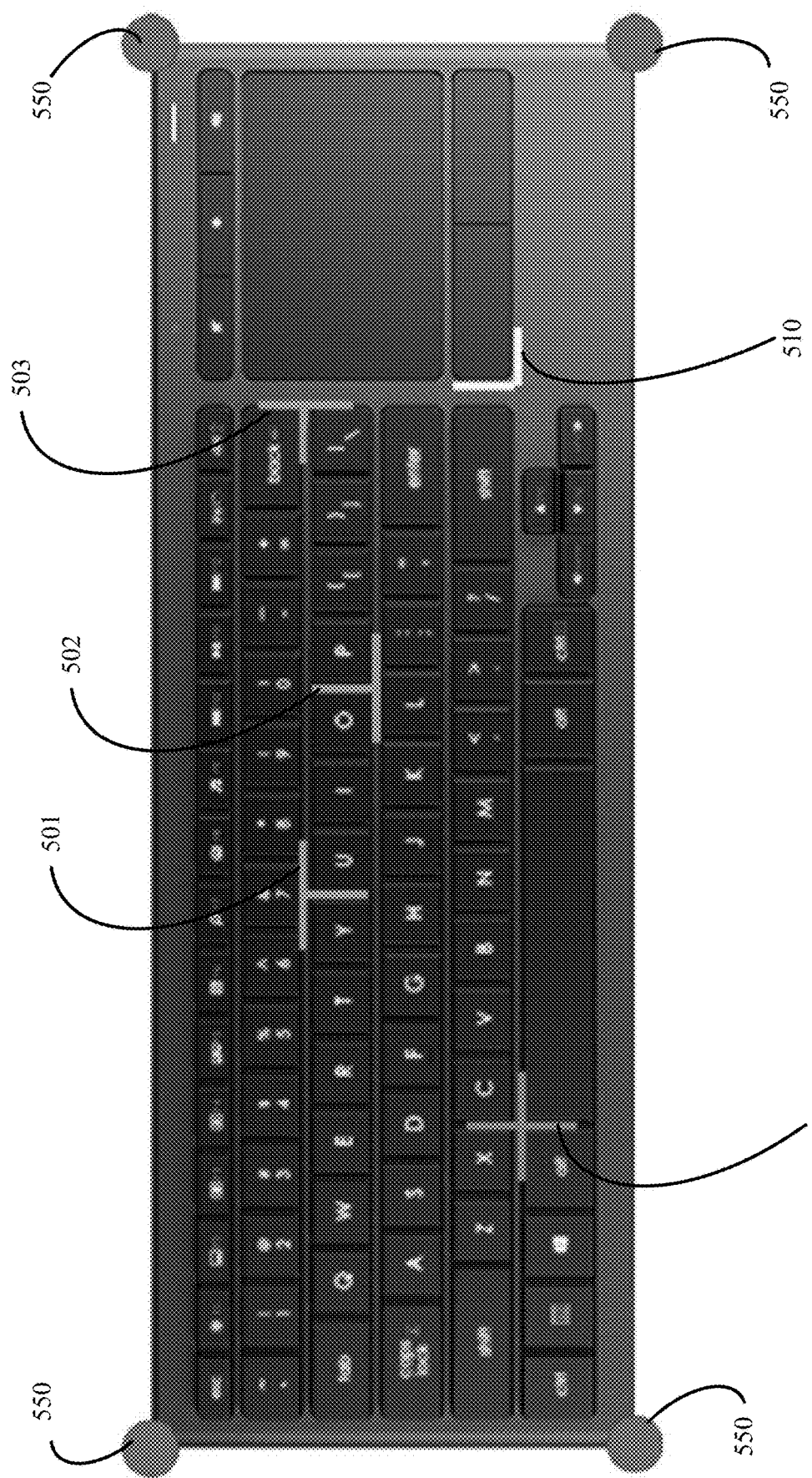
FIGS. 5A-5B illustrate an example image of a physical keyboard.
Figure 5B:
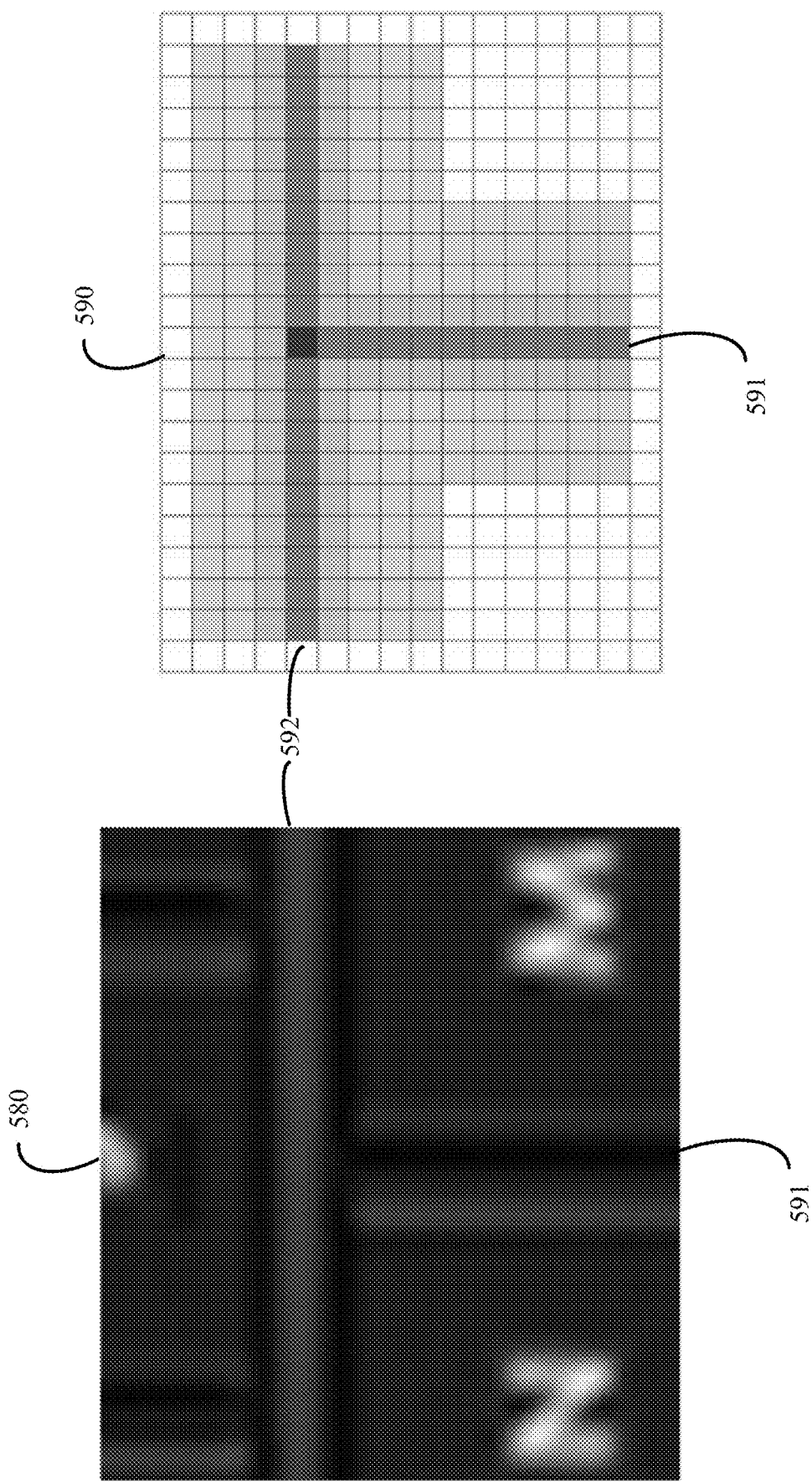

In an embodiment, distinct features of a keyboard may be identified based on visual characteristics formed by certain shapes existing in spaces between the keys or buttons of the keyboard or the corners of the keyboard. For example, FIG. 5A illustrates an example image of a physical keyboard with T-shape features 501, 502, and 503, L-shape feature 510, and X-shape feature 520. Typically, the most common shape feature of a keyboard is the T-shape. For example, the keyboard shown in FIG. 5A has approximately 120 T-shapes and 3 X-shapes. A T-shape is comprised of a top portion referred to as the roof portion and a bottom portion referred to as the trunk portion. FIG. 5B illustrates an example T-shape template 590 used for detecting T-shapes of a keyboard and a close-up view of a portion of the keyboard corresponding to one of the detected T-shapes 580. FIG. 5B also provides an indication of where the roof portions 592 and the trunk portions 591 of the T-shapes are. A T-shape may be formed by the visual characteristics of the spaces between two or more keys of a keyboard, the space between two adjacent keys in the same row forming the trunk portion of the T-shape. For example, a T-shape may be formed by two keys in one row and a third key in an adjacent row (e.g., the T-shape 580 illustrated in FIG. 5B). A T-shape may be formed by two keys in one row and another two keys in an adjacent row (e.g., the bottom half of the X-shape 520 illustrated in FIG. 5A). As described below, an X-shape may be formed by combining two T-shapes with opposite orientations. A T-shape may also be formed by two keys without any other keys if each of the two keys is the right-most key or the left-most key in separate, but adjacent rows, the roof portion of the T-shape being formed by the space on the right side or left side of the two keys (e.g., the T-shape 503 illustrated in FIG. 5A). A T-shape may also be formed by two keys without any other keys if both of the two keys are in the top-most row, or the bottom-most row, the roof portion of the T-shape being formed by space on the top of, or bottom of, the two keys. Each detected T-shape may be associated with an orientation. For example, in FIG. 5A, the T-shape 501 is orientated such that its trunk is facing downwards with respect to its roof, the T-shape 502 is orientated such that its trunk is facing upwards with respect to its roof, and the T-shape 503 is orientated such that its trunk is facing towards the left with respect to its roof. Each shape feature may be associated with a positive or negative sign depending the appearance of the shape feature: a positive sign may be assigned to a shape feature if the space between the keys, which forms the shape feature, is lighter in comparison to the surrounding keys; and a negative sign may be assigned to a shape feature if the space between the keys, which forms the shape feature, is darker in comparison to the surrounding keys. Alternatively, the opposite signs than those described above may be assigned to the shape features. For example, in FIG. 5A, the T-shape 503 may be assigned a positive sign since the keys surrounding the T-shape 503 appear darker than the spaces between the keys. In an embodiment, two T-shapes with opposite orientations may be joined to form an X-shape, such as the X-shape 520 illustrated in FIG. 5A.

Figure 6A:
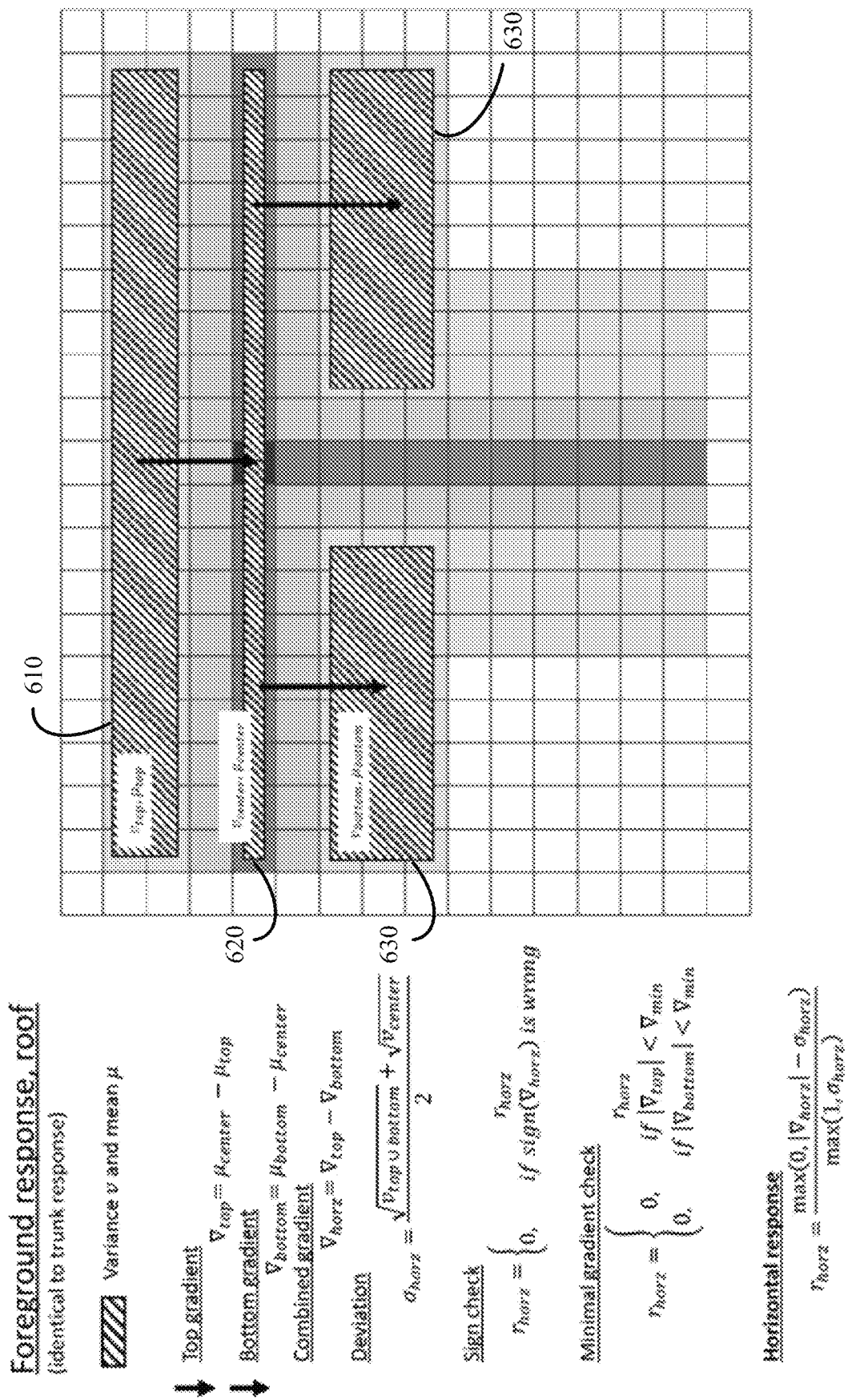
FIGS. 6A-6B illustrate one approach for detecting the shape features of a keyboard.
Figure 6B:
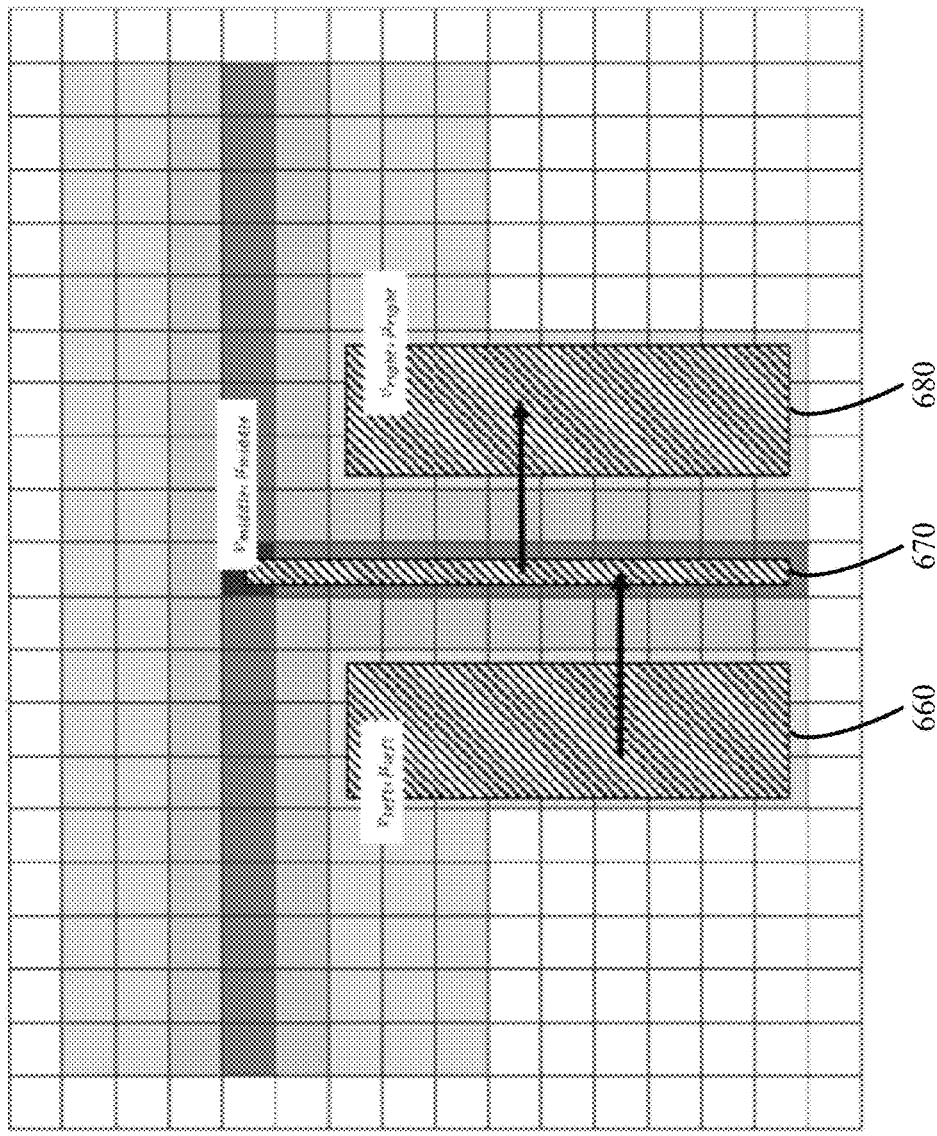
Figure 6B:

In an embodiment, T-shape features of a keyboard are detected by evaluating the pixel intensities of an image depicting the keyboard. In one approach, a gradient- and variance-based approach is used for identifying the T-shapes in an image depicting the keyboard. FIGS. 6A-6B illustrate one approach for detecting the T-shape features based on a gradient and variance approach. Typically, in an image depicting a keyboard, one of the most distinctive features of the keyboard correspond to the difference of the pixel intensities of the keyboard keys and the spaces between the keys. For example, in FIG. 4, the image 401 shows keyboard keys in contrast with the darker spaces between the keys and images 402 and 403 show keyboard keys in contrast with the lighter spaces between the keys. The gradient- and variance-based approach leverages such differences in pixel intensities to detect shape features of a keyboard. This approach can be divided into two steps, the first of which involves evaluating the gradient of the pixel intensities for the roof portion of the T-shape and the second of which involves evaluating the gradient of the pixel intensities for the trunk portion of the T-shape.

FIG. 6A illustrates, in accordance to one embodiment, the step of evaluating the gradient of the pixel intensities of the roof portion. This step involves identifying four groups of pixels in a pixel block: the top portion 610, which may correspond to the bottom edge portion of a particular key, or keys; the two bottom portions 630, each of which may correspond to the top portion of a particular key; and the center portion 620 that is between the top portion 610 and the bottom portions 630. In an embodiments, identifying the four groups of pixels involves identifying groups of pixels with pixel intensities that are substantially uniform, or have less than a particular amount of variance. For example, the variance of the pixel intensities of the pixels in each of the top portion 610, center portion 620, and bottom portions 630 may be less than a predetermined minimum amount of variance. In addition to computing the variances over the four regions, the gradients of the pixel intensities between the groups of pixels are determined. The top gradient is determined based on the difference of the mean pixel intensity value of the top portion 610 and those of the center portion 620. The bottom gradient is determined based on the difference of the mean pixel intensity value of the center portion 610 and those of the bottom portions 630. The horizontal response referenced in FIG. 6A combines the variances of the different regions corresponding to the roof portion of the T-shape and the gradients between these regions in order to be insensitive to varying brightness, contrast, and image noise. If the top gradient and the bottom gradient are both greater than a particular minimum gradient value, then the horizontal response is calculated on the basis thereof. Alternatively, if either the top gradient or the bottom gradient is determined to be less than the minimum gradient value, the horizontal response is assigned a zero value.

FIG. 6B illustrates, in accordance to one embodiment, the step of evaluating the gradient of the pixel intensities of the trunk portion. This step involves identifying three groups of pixels in a pixel block: the left portion 660, which may correspond to the right edge portion of a particular key of a keyboard; the right portion 680, which may correspond to the left edge portion of a particular key of a keyboard; and the middle portion 670 that is between the left portion 660 and the right portion 680. In an embodiment, identifying the three groups of pixels involves identifying groups of pixels with pixel intensities that are substantially uniform, or have less than a particular amount of variance. For example, the variance of the pixel intensities of the pixels in each of the left portion 660, middle portion 670, and right portion 680 may be less than a predetermined minimum amount of variance. In addition to computing the variances over the three regions, the gradients of the pixel intensities between the groups of pixels are determined. The left gradient is determined based on the difference of the mean pixel intensity value of the left portion 660 and those of the middle portion 670. The right gradient is determined based on the difference of the mean pixel intensity value of the middle portion 670 and the right portion 680. The vertical response referenced in FIG. 6B combines the variances of the different regions corresponding to the trunk portion of the T-shape in order to be insensitive to varying brightness, contrast, and image noise. If the left gradient and the right gradient are both greater than a particular minimum gradient value, then the vertical response is calculated on the basis thereof. Alternatively, if either the left gradient or the right gradient is determined to be less than the minimum gradient value, the vertical response is assigned a zero value.

In an embodiment, T-shapes are identified by combining the horizontal and vertical responses (e.g., either by summing or multiplying) and determining whether the combined response value is greater than a predetermined minimum response value. If the combined response value is less than the minimum response value, then it is determined that the pixel block did not contain a T-shape. In an embodiment where multiple adjacent combined responses are detected, the combined response with the strongest response value, or the strongest absolute response value, may be selected for that group. In some embodiments, referencing FIG. 6A, the top and bottom portions may be configured so the size and shape of the top portion 610 substantially match with those of the bottom portions 630. This allows the horizontal response to be consistent whether it is calculated from the direction of top-to-bottom or bottom-to-top, further allowing the horizontal response to be combined with a vertical response corresponding to a T-shape oriented downwards or a vertical response corresponding to a T-shape oriented upwards. For example, the top portion 610 may be divided into two portions corresponding to the two bottom portions 630. Alternatively, the two bottom portions 630 may be combined into a single portion, instead of being separated by the trunk portion of the T-shape template. In some embodiments, referencing FIG. 6B, the height of the middle portion 670 may be adjusted to substantially match the height of the left and right portions 660 and 680. This allows the vertical response to be consistent whether it is calculated from the direction of right-to-left or left-to-right, further allowing the vertical response to be combined with a horizontal response corresponding to a T-shape oriented downwards or upwards.

Figure 7:
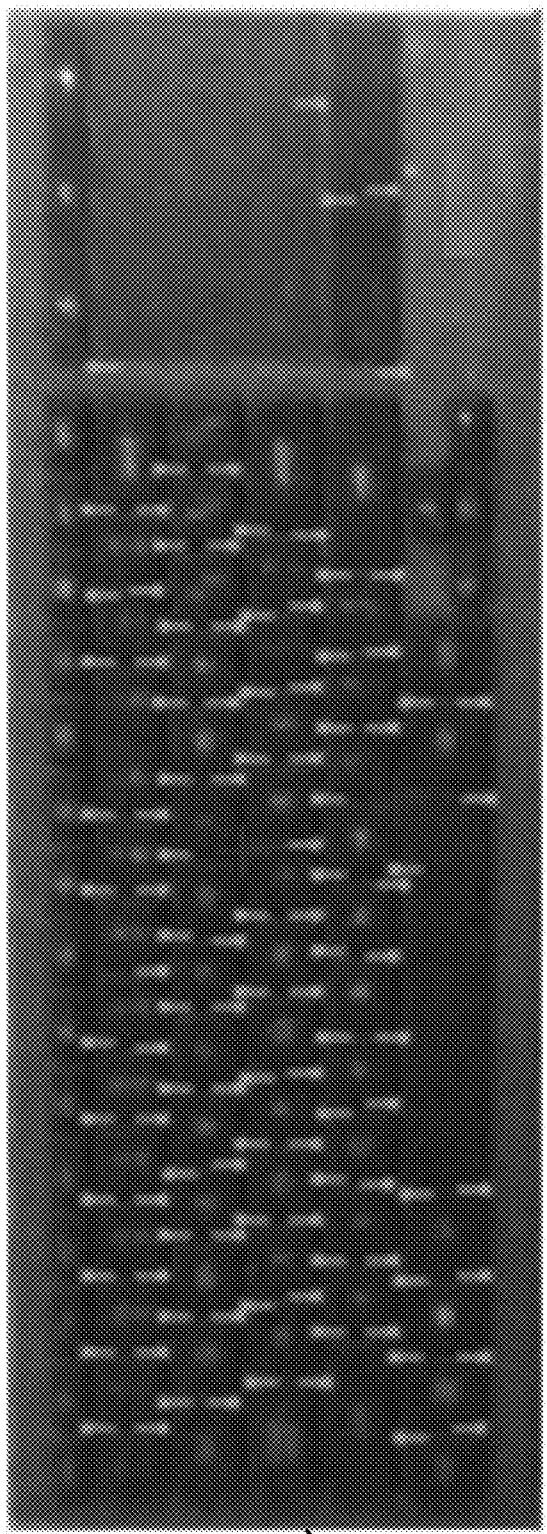
FIG. 7 illustrates an example keyboard and a virtual model of the keyboard.
Figure 7:
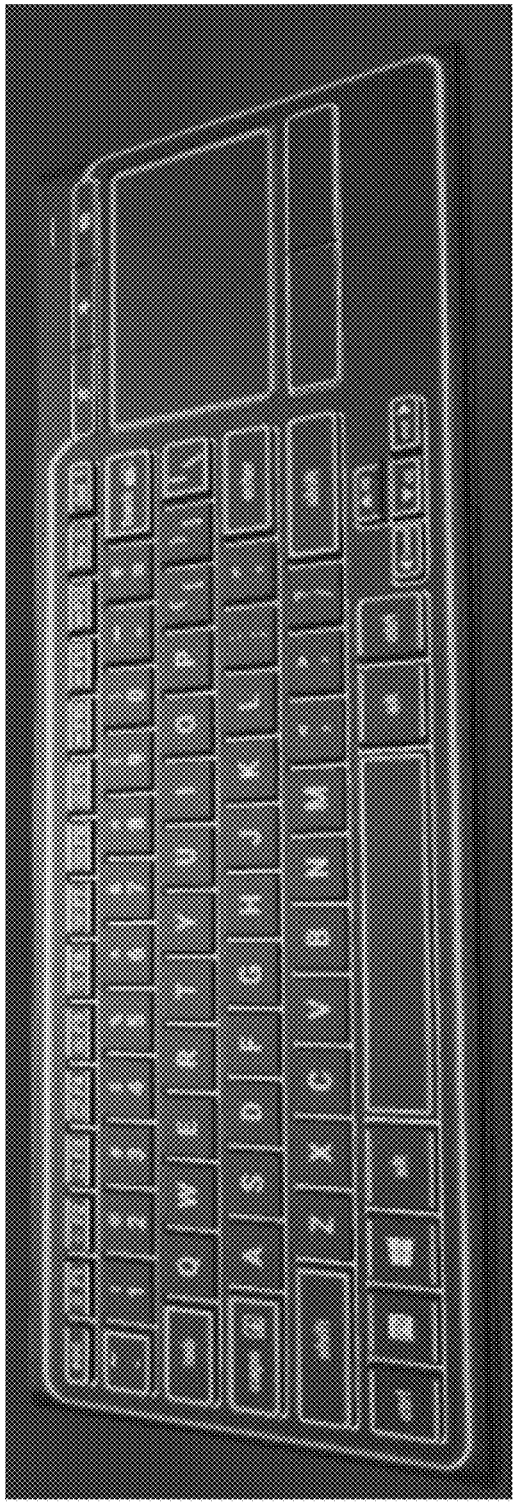

In an embodiment, the VR model generator 320 generates, obtains, or identifies a virtual model for a keyboard based on the shape features and/or corner features. FIG. 5A illustrates examples of shape features (e.g., 501, 502, 503, 510, and 520) and corner features (e.g., 550). In an embodiment, a virtual model of a physical keyboard is generated based on the features detected on the physical keyboard, such as the corner features and shape features, including the orientations and signs of the shape features. For example, FIG. 7 illustrates an example keyboard 710 with some of the detected shape features, which a virtual model 720 may be generated based upon. In an embodiment, the virtual model may be a 3-dimensional virtual object and each detected features may be assigned 3-dimensional location on the virtual model. In some embodiments, the VR model generator 320 may generate a simplified version of the virtual model as a 2-dimensional virtual object and assign a 2-dimensional location to each of the detected features. The simplified virtual model may enable the matching process described below to be performed faster and more efficiently. In an embodiment, the virtual model may be generated to include information about the topology of the keyboard. A keyboard's topology includes information regarding, for example, the number of rows of the keyboard, identification of the rows that the shape feature belongs to, size of the keys, distance between the keyboard rows, etc.

Figure 8A:
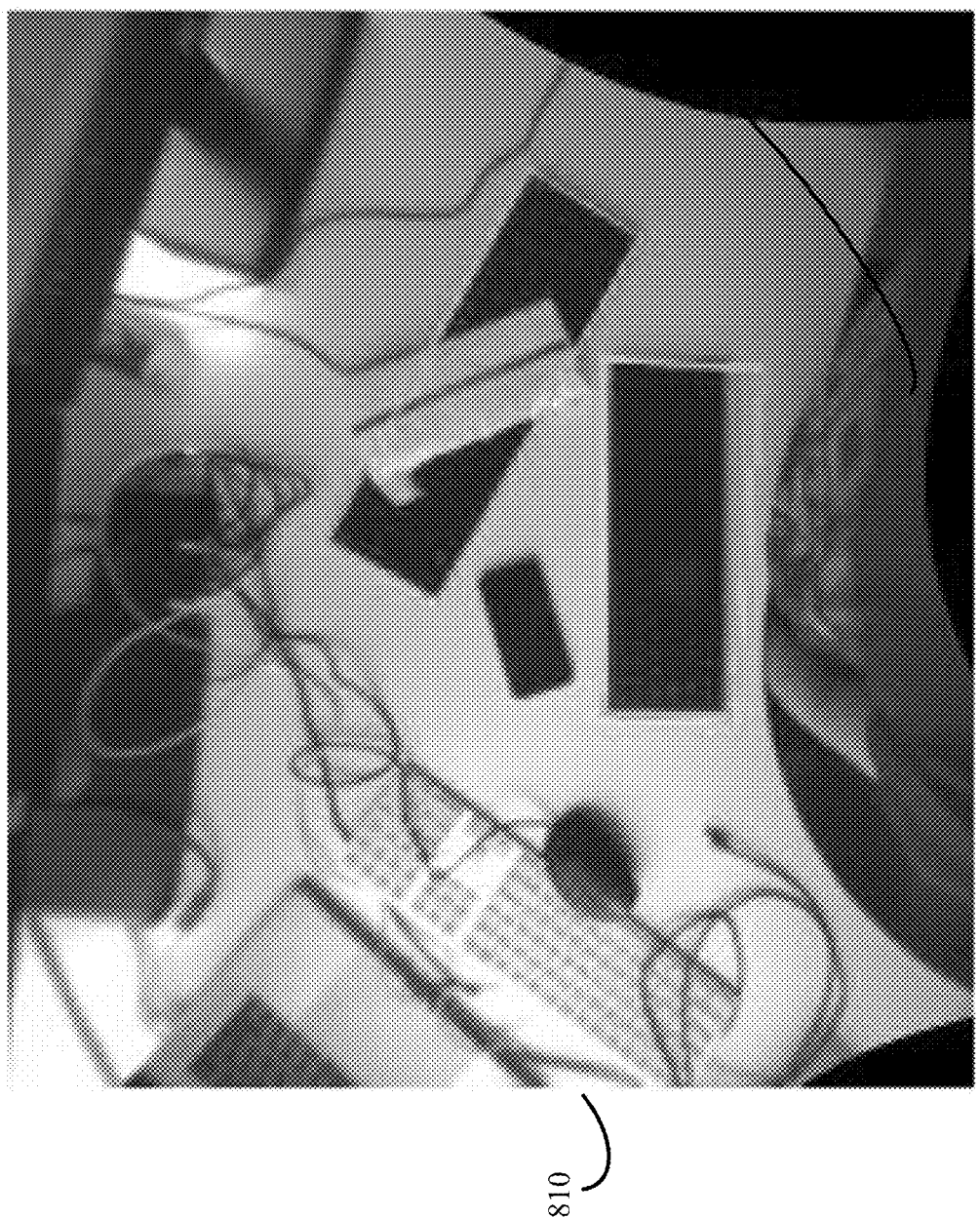
FIGS. 8A-8B illustrate an example keyboard demonstrating the method for determining the pose of a physical keyboard based on the keyboard's features.
Figure 8B:
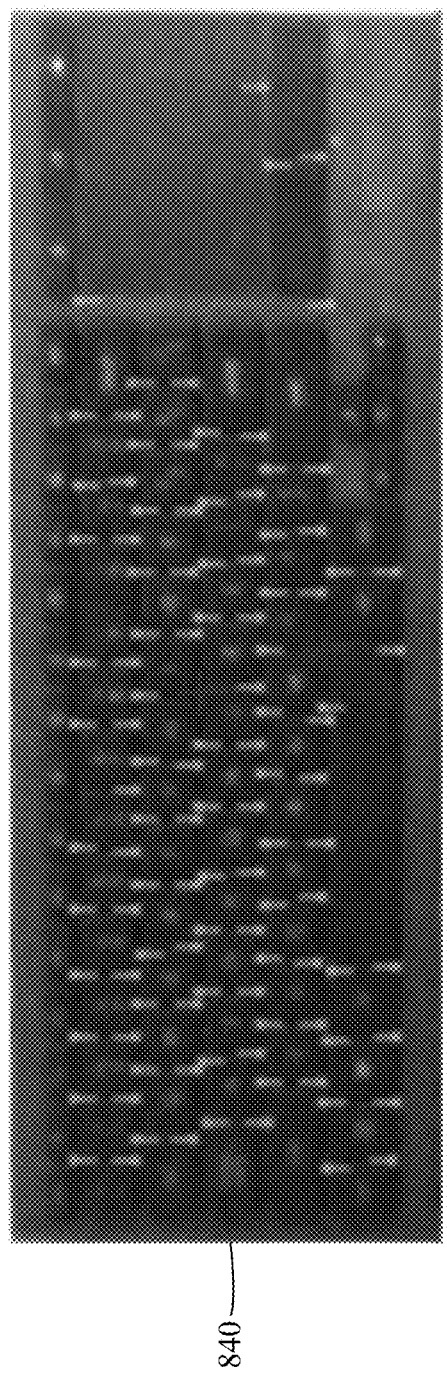

FIGS. 8A-8B illustrate an example keyboard demonstrating the method for determining the pose of a physical keyboard based on the keyboard's features. The method may begin by capturing an image from a viewpoint corresponding to the imaging sensors of an HMD. An example image is illustrated in FIG. 8A. In some embodiments where the image is captured by imaging sensors with fisheye lens, the image may appear as being warped or distorted. In such embodiments, the image may be processed to remove the distortion. For example, FIG. 8A illustrates an image 810 that has been processed to remove the distortion from the fisheye lens. In some embodiments, if the keyboard depicted in the image does not appear to be rectangular (e.g., appears as a trapezoid), the keyboard may be rectified into a rectangle. For example, FIG. 8B illustrates a keyboard image 840 that has been rectified into a rectangular shape. In some embodiments, a stereo camera may be used to capture two images of the keyboard, one image from each of the two lens of the stereo camera. In such embodiments, shape features may be separately detected in the two images, allowing the keyboard pose to be calculated based on the shape features detected in two images.

In an embodiment, to determine whether any keyboards are depicted in the image (e.g., initial detection phase), edge-based detection may be used. Edge-based detection differs from shape-based detection in that it looks for the outer edges of the keyboard (e.g., the four sides of the keyboard) rather than the shape features of the keyboard (e.g., T-shape features). While edge-based detection is typically less precise in determining the pose of a keyboard, it is still able to determine the rough pose of the keyboard. Moreover, given that edge-based detection is computationally less expensive than shape-based detection, it may be better suitable for the initial detection phase where the goal is to determine whether any keyboard is depicted in the image. In some embodiments, shape-based detection may be used instead of edge-based detection for the initial keyboard detection phase. For example, in situations where portions of the keyboard are occluded (e.g., by a user's hands) or the keyboard features are otherwise not detected, shape-based detection may be better suitable for detecting the keyboard since the number of feature correspondences detected using shape-based detection is much greater than those of edge-base detection (e.g., typically a keyboard has over 100 shapes features verses 4 edge features). Said differently, if some of the keyboard edges are occluded, edge-base detection may not be able to detect the keyboard since a typical keyboard only has 4 edges (sides), whereas shape-based detection may be able to detect a keyboard even if a portion of the many shape features are occluded by relying on other non-occluded shape features. In some embodiment, to determine whether any keyboards are depicted in the image (e.g., initial detection phase), deep learning approach may be applied to the image to detect the rough locations of the four corners of the keyboard.

In an embodiment, after identifying a keyboard in an image and determining the rough pose of the keyboard (e.g., based on edge-based detection), shape-based detection may be used to determine the precise pose of the keyboard. In an embodiment, the image of the keyboard may be partitioned into blocks of pixels, then, shape features of the keyboard may be detected by comparing each of the pixel blocks to shape pattern templates (e.g., T-shape templates illustrated in FIGS. 6A and 6B, X-shape template, or L-shape template). For example, FIG. 8B illustrates a keyboard 840 with the shape features that has been detected on the keyboard. In an embodiment, the detected shape features are clustered into groups based on the keyboard rows. The clusters of features provide unique characteristic patterns that can be compared to those of the virtual models stored in a database to find a virtual model matching the keyboard. Once a matching virtual model is found, the precise pose of the keyboard can be determined by projecting the virtual model in the virtual space toward the viewpoint of the camera that captured the image and adjusting the pose of the virtual model until the feature correspondences of the keyboard and the virtual model match each other (e.g., by minimizing the projection errors). In an embodiment, if a virtual model of the physical keyboard does not exist, or cannot be found, in the database, a virtual model of the keyboard may be generated based on the detected features of the physical keyboard and stored in the database.

In an embodiment, after the precise pose for the keyboard is determined, the keyboard may be continuously tracked to determine whether the keyboard is still at the expected location. If not, the pose of the keyboard may be determined again by implementing edge-based detection or shape-based detection. In an embodiment, to minimize the computational costs associated with tracking process, edge-based detection may first be used determine whether the keyboard is at the expected location since edge-based detection is computationally less expensive than shape-based detection. If the edge-based detection fails to detect a keyboard, shape-based detection may be used instead. In an embodiment, the tracking process may include an active phase where the object detector 310 is actively tracking a keyboard and an idle phase where the keyboard is not being tracked. The object detector 310 may only intermittently implement the active phase to minimize the computational costs and improve battery life of the HMD. In an embodiment, the object detector 310 may adjust the length of time the active phase and idle phase are implemented based on various conditions. For example, the object detector 310 may initially implement the active phase for a longer time period than the idle phase, but if the keyboard remains stationary for a substantial period of time, the object detector 310 may adjust the implementations such that the idle phase is implemented longer than the active phase. In some embodiments, the object detector 310 may manually implement active phase in situations where there is an indication that the keyboard may be moved by a user (e.g., when the hands of a user are detected as being near the left and right sides of the keyboard, or when the user presses a particular key(s)).

Figure 9:
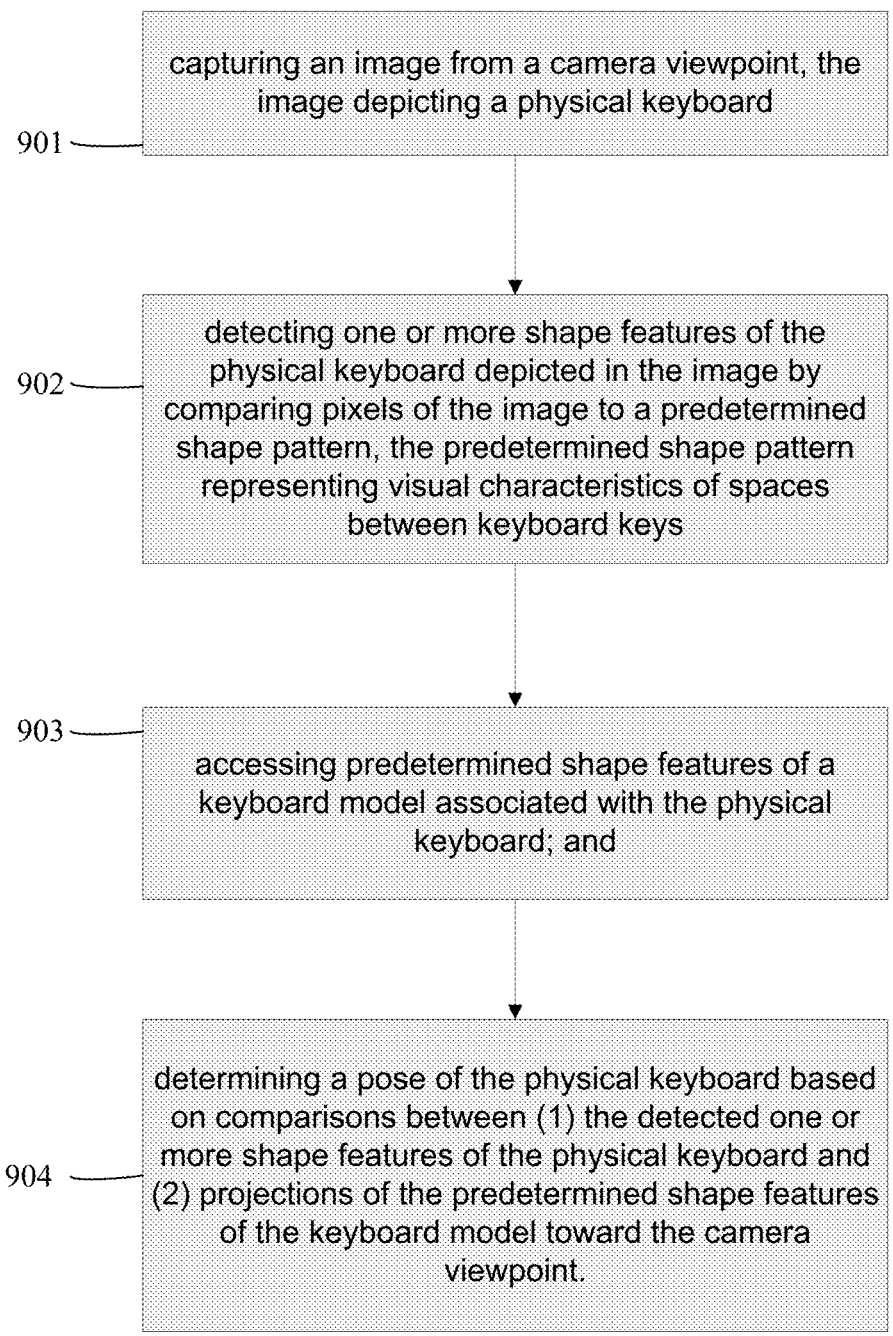
FIG. 9 illustrates an example method for determining the pose of a keyboard.

FIG. 9 illustrates an example method 900 for determining the pose of a keyboard. The method may begin at step 901 by capturing an image from a camera viewpoint, the image depicting a physical keyboard. At step 902, the method may continue by detecting one or more shape features of the physical keyboard depicted in the image by comparing pixels of the image to a predetermined shape pattern, the predetermined shape pattern representing visual characteristics of spaces between keyboard keys. At step 903, the method may continue by accessing predetermined shape features of a keyboard model associated with the physical keyboard. At step 904, the method may continue by determining a pose of the physical keyboard based on comparisons between (1) the detected one or more shape features of the physical keyboard and (2) projections of the predetermined shape features of the keyboard model toward the camera viewpoint. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining the pose of a keyboard, this disclosure contemplates any suitable method for determining the pose of a keyboard including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
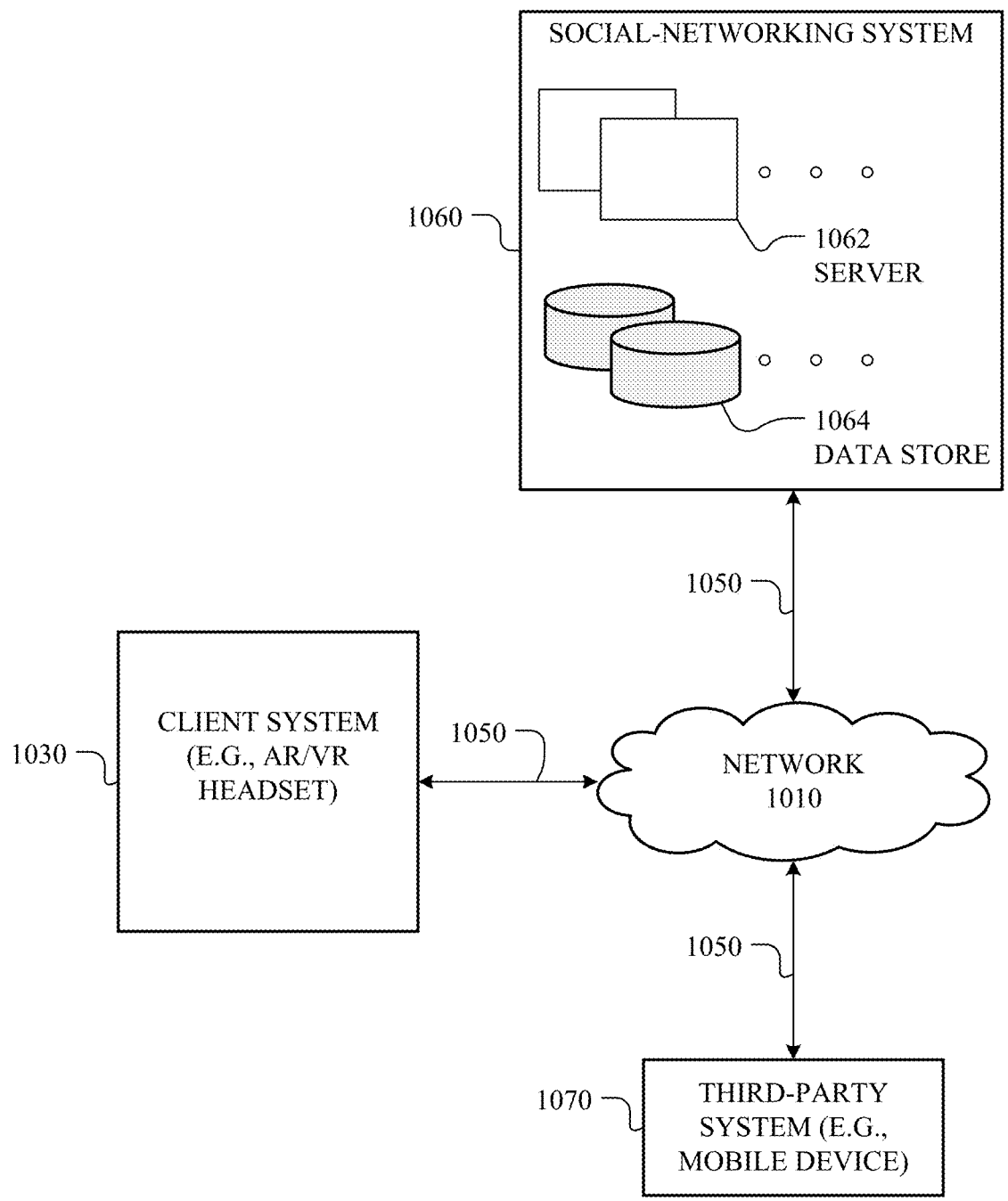
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. For example, an AR/VR headset 1030 may be connected to a local computer or mobile computing device 1070 via short-range wireless communication (e.g., Bluetooth). Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include a short-range wireless network (e.g., Bluetooth, Zigbee, etc.), an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi, Worldwide Interoperability for Microwave Access (WiMAX), Bluetooth), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a VR/AR headset, desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include a local computing device that is communicatively coupled to the client system 1030. For example, if the client system 1030 is an AR/VR headset, the third-party system 1070 may be a local laptop configured to perform the necessary graphics rendering and provide the rendered results to the AR/VR headset 1030 for subsequent processing and/or display. In particular embodiments, the third-party system 1070 may execute software associated with the client system 1030 (e.g., a rendering engine). The third-party system 1070 may generate sample datasets with sparse pixel information of video frames and send the sparse data to the client system 1030. The client system 1030 may then generate frames reconstructed from the sample datasets.

In particular embodiments, the third-party system 1070 may also include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider (e.g., including sparse sample datasets described herein). A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
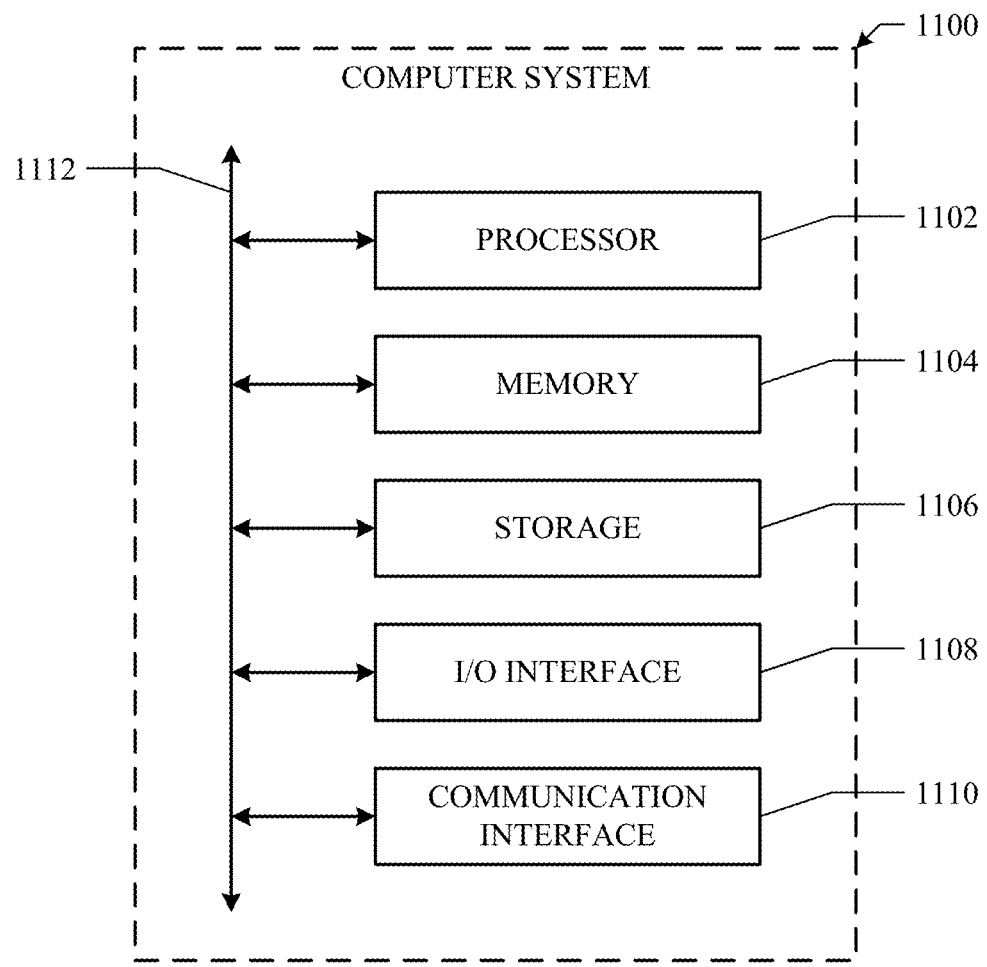
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-onchip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
capturing an image from a camera viewpoint, the image depicting a physical keyboard;
detecting one or more shape features of the physical keyboard depicted in the image by comparing pixels of the image to a predetermined shape template, wherein each of the one or more shape features of the physical keyboard corresponds to visual characteristics of a space between two or more keyboard keys of the physical keyboard, wherein comparing the pixels comprises evaluating gradients of pixel intensities of the pixels;

accessing predetermined shape features of a keyboard model associated with the physical keyboard, wherein each of the predetermined shape features of the keyboard model defines visual characteristics of a space between two or more keyboard keys of the keyboard model; and determining a pose of the physical keyboard based on comparisons between (1) the detected one or more shape features of the physical keyboard and (2) projections of the predetermined shape features of the keyboard model toward the camera viewpoint.

2. The method of claim 1, wherein the predetermined shape template is a T-shape template with a trunk portion and a roof portion, the trunk portion representing visual characteristics of a space between two keyboard keys in a first keyboard row.

3. The method of claim 2, wherein the roof portion of the T-shape template represents visual characteristics of a space between (1) a portion of the first keyboard row corresponding to the two keyboard keys in the first keyboard row and (2) one or more keyboard keys in a second keyboard adjacent to the first keyboard row.

4. The method of claim 2, wherein the first keyboard row is:
a top-most row of a keyboard, the roof portion of the T-shape template representing visual characteristics of a space above the two keyboard keys in the first keyboard row; or
a bottom-most row of the keyboard, the roof portion of the T-shape template representing visual characteristics of a space below the two keyboard keys in the first keyboard row.

5. The method of claim 1, wherein the predetermined shape template is a T-shape template with a trunk portion and a roof portion, the trunk portion representing visual characteristics of a space between a first keyboard key in a first keyboard row and a second keyboard key in a second keyboard row, the second keyboard row being adjacent to the first keyboard row, wherein:
the first keyboard key is a right-most key in the first keyboard row and the second keyboard key is a right-most key in the second keyboard row, the roof portion of the T-shape template representing visual characteristics of a space right of the first keyboard key and the second keyboard key; or
the first keyboard key is a left-most key in the first keyboard row and the second keyboard key is a left-most key in the second keyboard row, the roof portion of the T-shape template representing visual characteristics of a space left of the first keyboard key and the second keyboard key.

6. The method of claim 1, wherein comparing the pixels of the image to the predetermined shape template further comprises:
partitioning the image into a plurality of pixel blocks, each pixel block comprising a plurality of pixels;
for each of the pixel blocks:
determining visual characteristics of the pixel block based on pixel intensities associated with the plurality of pixels in the pixel block; and
comparing the visual characteristics of the pixel block to the predetermined shape template representing the visual characteristics of the spaces between the keyboard keys; and
detecting the one or more shape features of the physical keyboard depicted in the image based on the comparison of the visual characteristics of the pixel block of the image with the predetermined shape template representing the visual characteristics of the spaces between the keyboard keys.

7. The method of claim 6, wherein determining the visual characteristics of the pixel block based on the pixel intensities associated with the plurality of pixels in the pixel block comprises:
comparing pixel intensities associated with at least one portion of the pixel block to another portion of the pixel block to determine a gradient and a variance of the pixel intensities associated with the various portions of the pixel block.

8. The method of claim 1, further comprising:
rendering a representation of the keyboard model to match the pose of the physical keyboard.

9. The method of claim 1, further comprising, prior to accessing the predetermined shape features of the keyboard model associated with the physical keyboard:
identifying the keyboard model from a database comprising a plurality of keyboard models by comparing the detected one or more shape features of the physical keyboard with predetermined shape features of the plurality of keyboard models in the database.

10. The method of claim 1, wherein the predetermined shape template is a L-shape template or a X-shape template.

11. One or more computer-readable non-transitory storage media embodying software that is operable when executed to:
capture an image from a camera viewpoint, the image depicting a physical keyboard;
detect one or more shape features of the physical keyboard depicted in the image by comparing pixels of the image to a predetermined shape template, wherein each of the one or more shape features of the physical keyboard corresponds to visual characteristics of a space between two or more keyboard keys of the physical keyboard, wherein comparing the pixels comprises evaluating gradients of pixel intensities of the pixels;
access predetermined shape features of a keyboard model associated with the physical keyboard, wherein each of the predetermined shape features of the keyboard model defines visual characteristics of a space between two or more keyboard keys of the keyboard model; and
determine a pose of the physical keyboard based on comparisons between (1) the detected one or more shape features of the physical keyboard and (2) projections of the predetermined shape features of the keyboard model toward the camera viewpoint.

12. The one or more computer-readable non-transitory storage media of claim 11, wherein the predetermined shape template is a T-shape template with a trunk portion and a roof portion, the trunk portion representing visual characteristics of a space between two keyboard keys in a first keyboard row.

13. The one or more computer-readable non-transitory storage media of claim 12, wherein the roof portion of the T-shape template represents visual characteristics of a space between (1) a portion of the first keyboard row corresponding to the two keyboard keys in the first keyboard row and (2) one or more keyboard keys in a second keyboard adjacent to the first keyboard row.

14. The one or more computer-readable non-transitory storage media of claim 11, wherein comparing the pixels of the image to the predetermined shape template further comprises:

partitioning the image into a plurality of pixel blocks, each pixel block comprising a plurality of pixels;

for each of the pixel blocks:
- determining visual characteristics of the pixel block based on pixel intensities associated with the plurality of pixels in the pixel block; and
- comparing the visual characteristics of the pixel block to the predetermined shape template representing the visual characteristics of the spaces between the keyboard keys; and detecting the one or more shape features of the physical keyboard depicted in the image based on the comparison of the visual characteristics of the pixel block of the image with the predetermined shape template representing the visual characteristics of the spaces between the keyboard keys.

15. The one or more computer-readable non-transitory storage media of claim 14, wherein determining the visual characteristics of the pixel block based on the pixel intensities associated with the plurality of pixels in the pixel block comprises:
- comparing pixel intensities associated with at least one portion of the pixel block to another portion of the pixel block to determine a gradient and a variance of the pixel intensities associated with the various portions of the pixel block.

16. A system comprising: one or more processors; and one or more computer-readable non-transitory storage media in communication with the one or more processors, the one or more computer-readable non-transitory storage media comprising instructions that when executed by the one or more processors, cause the system to:
- capture an image from a camera viewpoint, the image depicting a physical keyboard;
- detect one or more shape features of the physical keyboard depicted in the image by comparing pixels of the image to a predetermined shape template, wherein each of the one or more shape features of the physical keyboard corresponds to visual characteristics of a space between two or more keyboard keys of the physical keyboard, wherein comparing the pixels comprises evaluating gradients of pixel intensities of the pixels;
- access predetermined shape features of a keyboard model associated with the physical keyboard, wherein each of the predetermined shape features of the keyboard model defines visual characteristics of a space between two or more keyboard keys of the keyboard model; and
- determine a pose of the physical keyboard based on comparisons between (1) the detected one or more shape features of the physical keyboard and (2) projections of the predetermined shape features of the keyboard model toward the camera viewpoint.

17. The system of claim 16, wherein the predetermined shape template is a T-shape template with a trunk portion and a roof portion, the trunk portion representing visual characteristics of a space between two keyboard keys in a first keyboard row.

18. The system of claim 17, wherein the roof portion of the T-shape template represents visual characteristics of a space between (1) a portion of the first keyboard row corresponding to the two keyboard keys in the first keyboard row and (2) one or more keyboard keys in a second keyboard adjacent to the first keyboard row.

19. The system of claim 16, wherein comparing the pixels of the image to the predetermined shape template further comprises:

partitioning the image into a plurality of pixel blocks, each pixel block comprising a plurality of pixels;

for each of the pixel blocks:
- determining visual characteristics of the pixel block based on pixel intensities associated with the plurality of pixels in the pixel block; and
- comparing the visual characteristics of the pixel block to the predetermined shape template representing the visual characteristics of the spaces between the keyboard keys; and detecting the one or more shape features of the physical keyboard depicted in the image based on the comparison of the visual characteristics of the pixel block of the image with the predetermined shape template representing the visual characteristics of the spaces between the keyboard keys.

20. The system of claim 19, wherein determining the visual characteristics of the pixel block based on the pixel intensities associated with the plurality of pixels in the pixel block comprises:
- comparing pixel intensities associated with at least one portion of the pixel block to another portion of the pixel block to determine a gradient and a variance of the pixel intensities associated with the various portions of the pixel block.

* * * * *